(12) United States Patent
Wang et al.

(10) Patent No.: US 9,889,497 B2
(45) Date of Patent: Feb. 13, 2018

(54) MOLDING MATERIALS FOR NON-FERROUS CASTING

(71) Applicant: ASK CHEMICALS L.P., Wilmington, DE (US)

(72) Inventors: Xianping Wang, Dublin, OH (US); Gregory P. Sturtz, Dublin, OH (US); Kathleen E. Lowe, Powell, OH (US); Joerg Kroker, US, OH (US)

(73) Assignee: ASK Chemicals L.P., Wilmington, DE (US)

( * ) Notice: Subject to any disclaimer, the term of this patent is extended or adjusted under 35 U.S.C. 154(b) by 0 days.

(21) Appl. No.: 15/545,388

(22) PCT Filed: Dec. 14, 2016

(86) PCT No.: PCT/US2016/066593
§ 371 (c)(1),
(2) Date: Jul. 21, 2017

(87) PCT Pub. No.: WO2017/106302
PCT Pub. Date: Jun. 22, 2017

(65) Prior Publication Data
US 2018/0001372 A1    Jan. 4, 2018

Related U.S. Application Data

(60) Provisional application No. 62/269,499, filed on Dec. 18, 2015.

(51) Int. Cl.
*B22C 1/08* (2006.01)
*C04B 35/628* (2006.01)
*B22C 9/02* (2006.01)

(52) U.S. Cl.
CPC ............. *B22C 1/08* (2013.01); *C04B 35/628* (2013.01); *B22C 9/02* (2013.01)

(58) Field of Classification Search
CPC ............ B22C 1/08; B22C 9/02; C04B 35/628
See application file for complete search history.

(56) References Cited

U.S. PATENT DOCUMENTS

| | | | | |
|---|---|---|---|---|
| 3,810,506 A | * | 5/1974 | Kobayashi | B22D 7/12 164/133 |
| 4,088,624 A | * | 5/1978 | Bhattacharyya | C08K 3/16 164/521 |
| 4,495,316 A | | 1/1985 | Armbruster | |
| 5,602,192 A | * | 2/1997 | Yoshida | B22C 1/2246 164/526 |
| 5,632,326 A | * | 5/1997 | Gough | B22C 9/084 164/359 |
| 2011/0220314 A1 | * | 9/2011 | Gerhards | B22C 9/088 164/135 |

FOREIGN PATENT DOCUMENTS

EP      0198290 A2    10/1986
JP      2012076115 A   4/2012

* cited by examiner

*Primary Examiner* — Alexander Kollias
(74) *Attorney, Agent, or Firm* — Standley Law Group LLP

(57) ABSTRACT

A molding material mixture for producing casting molds for metal processing, particularly for non-ferrous metals, such as aluminum or magnesium, is intended to reduce problems such as metal-mold reaction and/or shrinkage porosity defect. The free-flowing refractory molding material in the molding material mixture is coated with a mixture of inorganic salts exhibiting a eutectic melting point in the range of about 400 C to about 500 C, particularly in the range of about 420 C to about 460 C. Preferably this coating occurs by contacting the inorganic salt mixture with the molding material mixture at a temperature between 500 C and 700 C, in a manner that maintains the free-flowing nature of the coated product. One mixture of inorganic salts that is used is a mixture consisting of, by weight: 74% potassium fluoroborate; 15% potassium chloride; and 12% potassium fluoride. This mixture has a eutectic melting point of 420 C.

36 Claims, No Drawings

MOLDING MATERIALS FOR NON-FERROUS CASTING

CROSS-REFERENCE TO RELATED APPLICATIONS

This application is a non-provisional application of, and makes a claim of priority to, U.S. provisional application 62/269,499, filed on 18 Dec. 2015, which is incorporated by reference as if fully recited herein.

TECHNICAL FIELD

This invention relates to methods and compositions for use in the casting of non-ferrous metals, especially aluminum and magnesium. More particularly, the invention relates to the use of one or more inorganic salts with the molding sand. A preferred use may be a coating of the molding sand. The inorganic salt may preferably have a low melting point and may be a single salt or a eutectic combination of salts. The preferred inorganic salt may have a halide anion, especially fluoride.

BACKGROUND

Professor John Campbell of the University of Birmingham, England, developed a series of rules for making reliable castings. One of the problems that he noted involves defects arising near the surface of non-ferrous metal castings. Because these defects are seen on surfaces of the casting that are in direct contact with the sand casting mold, these defects are commonly referred to as "metal mold reaction." There are three distinct sub-divisions of the defects.

The first type is a gas porosity defect, that is, a porosity that is attributed to subsurface gas bubble formation. The gas can arise from several sources, including gas (notably hydrogen) dissolved in the molten metal, gas entrained in the molten metal during the pour, and gas from chemical breakdown or reaction of the components of the mold or core. This last category could include reaction of the reactive aluminum surface with atmospheric water on or near the molding materials.

The second type is a shrinkage porosity defect. Because the metal in contact with the mold surface will solidify first and more quickly, especially in metals with a small freezing range, shrinkage of the metal can occur, although this is likely to be away from the mold surface, but there may be influences seen there.

The third type of defect is the hot tear, which tends to take the form of a ragged, branching crack. Some alloys may have a higher propensity for tearing and some tearing may be truly random. As grains are formed during solidification, the separation of the grains can result in a tear.

Light metals such as aluminum and magnesium have important applications in automotive, marine and aerospace applications. These applications often involve the casting of thin pieces. However, a high integrity casting is required, as the presence of defects, especially porosity, will result in rejection of the casting.

The rate of cooling at the metal/mold interface has been recognized as an important factor in the quality of the cast part. Slower cooling generally results in decreased mechanical properties, indicated by increased microstructural length scales, such as dendrite arm spacing. Castings with a finer microstructure show better tensile and fatigue properties. Castings with smaller dendrite arm spacing values are consistent with smaller gas porosity and shrinkage porosity defects.

Some prior approaches to molding defects have concentrated on the binder composition that holds the molding sand together. For example, U.S. Pat. No. 6,288,139 to Skoglund ("Skoglund '139") teaches a foundry binder system in which a Part I phenolic resin component and a Part II polyisocyanate component are used, where the Part II component contains from 0.1 to 5 weight % of an orthoester, the percentage being based upon the weight of the Part II component. Typically, these binder systems use the Parts I and II in a 55/45 weight ratio. Skoglund '139 recognizes that orthoesters have been known for stabilizing organic isocyanates, although the uses taught prior to Skoglund '139 did not extend to foundry binders and foundry mixes. When used in the Part II component, orthoesters were observed to improve tensile strength of the foundry shapes and the Part II components were observed to have lower turbidity at the time of use.

Another prior art approach is to add a composition directly to the alloy melt, with an intention of influencing or refining the grain structure in the casting. These "grain refiners" for aluminum include compounds such as titanium diboride ($TiB_2$) (CAS 12045-63-5), potassium fluoroborate ($KBF_4$) (CAS 14075-53-7) and potassium hexafluorotitanate ($K_2TiF_6$) (CAS 16919-27-0). Potassium fluoroborate is used as a sand additive in magnesium casting, but for a different reason. The compound inhibits the undesired formation of MgO, which can occur from reaction of hot magnesium with moisture or $SiO_2$, by making fluoride anions available to form $MgF_2$.

As useful as the known approaches have been, metal mold reaction, as particularly defined here, remains an ongoing problem for which the primary suggestion is to eliminate moisture from the mold when the metal pour occurs. Other factors may be influential. Improvement in the materials or techniques used is a desirable goal.

SUMMARY

These shortcomings of the prior art are overcome at least in part by the present invention, which pertains to a molding material mixture for producing casting molds for metal processing, particularly for non-ferrous metals, such as aluminum or magnesium. Such a mixture comprises a free-flowing refractory molding material and a binder. The binder is usually provided as a two-component system that is mixed and cured at the time of use. The refractory molding material has been coated with a mixture of inorganic salts exhibiting a eutectic melting point in the range of about 400 C to about 500 C, particularly in the range of about 420 C to about 460 C.

In many embodiments, the refractory molding material comprises a molding sand. In many of these embodiments, the binder system is an epoxy-acrylic binder that is cured with sulfur dioxide gas. In other embodiments, it can be a pair of polyurethane precursors, having a phenolic polyol component and an polyisocyanate component.

In many embodiments, the mixture of inorganic salts is a mixture of three inorganic salts, and it is preferred that each of the inorganic salts in the mixture has a Group IA cation, especially potassium. This can occur with potassium being present in at least one of the inorganic salts, but it may be present in all of the inorganic salts in the mixture.

In many embodiments, each of the inorganic salts in the mixture has, as an anion, either a halide anion or a fluorine complex of boron or titanium. In some of these embodiments, each of the inorganic salts in the mixture has fluorine as an anion.

In some of the embodiments, each of the inorganic salts in the mixture has an individual melting point that is greater than 500 C and at least two of the inorganic salts has an individual melting point that is greater than 700 C, even though the eutectic melting point is below 500 C.

In one particular embodiment, the mixture of inorganic salts is a mixture consisting of, by weight: 74% potassium fluoroborate; 15% potassium chloride; and 12% potassium fluoride, wherein the mixture has a eutectic melting point of 420 C.

In a second particular embodiment, the mixture of inorganic salts is a mixture consisting of, by weight: 59% potassium fluoride; 29% lithium fluoride; and 12% sodium fluoride, wherein the mixture has a eutectic melting point of 460 C.

In a third embodiment, the mixture of inorganic salts is a mixture consisting of, by weight: 50% potassium fluoroborate; 47% potassium hexafluorotitanate; and 3% potassium chloride, wherein the mixture has a eutectic melting point of 420 C.

In another aspect, the invention relates to a method of preparing a refractory molding material for use in producing casting molds for metal processing. In the method, a free-flowing refractory molding mixture, particularly a molding sand, is obtained. A mixture of inorganic salts exhibiting a eutectic melting point in the range of about 400 C to about 500 C, particularly in the range of about 420 C to about 460 C is also obtained.

The refractory molding mixture is contacted with the mixture of inorganic salts at a temperature in the range of about 500 C to about 700 C in a manner that maintains the free-flowing nature of the resulting refractory molding mixture that is coated with the mixture of inorganic salts; and the coated resulting refractory molding mixture is cooled to ambient temperature.

In a preferred way of practicing this method, the mixture of inorganic salts is contacted with the refractory molding material in an amount of about 0.3% to 0.4% by weight.

DETAILED DESCRIPTION OF THE PREFERRED EMBODIMENTS

Influencing the quality of a casting can be approached from several directions. As noted above, Skoglund '139 uses an approach where one or more additives are used in the binder system components. Another approach would be to add the additives in a particulate form to the molding sand. Such an additive would, however, increase the amount of material to be treated by the binder system and could result in an increase in the amount of binder needed to form a good mold or core. A third approach would be to pre-treat the molding sand with the additive(s), by applying them in a molten form or as a solution. Dispersing the additive(s) in the molding sand as a particulate introduces potential for segregation of the additive from the sand, as well as the issue of ineffective use, since a significant amount of the additive is not located at or near a metal/mold interface, where the problem being solved occurs.

Coating of individual sand granules with a molten component or a component in solution has the advantage of uniformly dispersing the additive, although it does not necessarily resolve the issue of ineffective use remote from the interface.

As a final possibility for applying the additive, the additive could be sprayed onto the relevant surfaces of the mold or core in a molten or solution form.

The investigation to date is of the influence of certain molding materials on the formation of porosity and shrink defects in Al castings. The incorporation of a small amount of a low melting point inorganic salt to the molding mixture seems to influence how quickly the heat is dissipated from the liquid metal into the core/mold. This in turn appears to have a positive effect on formation/control of the aforementioned sub-surface defects. On the other hand, increasing the cooling rate is known to control secondary dendritic arm spacing, which influences the mechanical properties of the cast metal part. The investigation is also looking at devising simple method to "measure" the latter.

A first test studied the effect of pre-coating a salt onto the molding sand as contrasted to an addition to the salt as a powder to the molding sand. The salt (Mixed Salt #1) selected for this experiment was a mixture with a eutectic melting point of approximately 420 C. The salt consisted of 74 wt % potassium fluoroborate ($KBF_4$), 15 wt % potassium chloride (KCl) (CAS 7447-40-7) and 11 wt % potassium fluoride (KF) (CAS 7789-23-3). It is important to note that the eutectic melting point is significantly lower that the individual melting points of these compounds. The melting point of the three salts in the mixture, in the order listed above, are 530 C, 780 C and 858 C.

Before testing the effects at the mold-metal interface, molding mixtures were prepared to assure that pre-coating with the salt and/or adding the salt to the molding sand would result in a useful core. A commercially-available two component binder, specifically a polyurethane cold box (PUCB) binder system was used. In such a system, the Part I component, commercially available from ASK Chemicals L.P., Dublin, Ohio as ISOCURE FOCUS™ I XX440, comprised a phenolic polyol base resin and a set of suitable complements. The Part II component, available as ISOCURE FOCUS II XX840 comprised a polyisocyanate accompanied by a set of suitable complements. The molding sand selected was Wedron 410, which is commercially available from Fairmont Santrol, Wedron, Ill.

In Example A, the salt was added, in an amount of 0.4 wt %, to the molding sand as a powder before the binder, in an amount of 1 wt % based on the sand, was added to the molding sand. The binder was added in a 50/50 ratio of Part I/Part II. After being mixed with the molding sand (with salt added as a powder), the resulting foundry mixture was blown into a dogbone shaped cavity and subsequently cured with dimethyl isopropylamine (DMIPA, CAS 996-35-0), according to conventional industry practice.

In Example B, the salt, in an amount of 0.4 wt %, was pre-coated onto the sand at a temperature of 550 C, which was then cooled to ambient temperature. Other than this, the procedure of Example A was replicated.

Tensile strength of the foundry mixtures was tested, using the "dogbone" specimens. At zero bench life, the Example A mixture had a tensile strength of 72 psi at 30 seconds, increasing to 99 psi at 1 hour and then decreasing to 63 psi at 24 hrs. The Example B mixture, under identical conditions, showed tensile strengths of 97, 168 and 161 psi, respectively. Clearly, the Example B mixture performed better and substantially retained its strength at 1 hour over the 24 hour period.

A second test of tensile strength was to test the tensile strength of specimen after storage for 24 hrs, in 90% relative humidity. In this case, the Example A mixture tested at 61 psi, which was very close to the 63 psi, while Example B dropped to 133 psi from the prior test at 161 psi, but again the strength of Example B significantly exceeded any result obtained for Example A.

A two hour bench life test was attempted for each mixture. However, the Example A mixture had cured completely and could not be made into cores. The Example B mixture had a 75 psi tensile strength after 30 seconds and 154 psi after 24 hours.

It is very clear from the foregoing that Mixed Salt #1 is capable of producing acceptable cores when the salt additive precoats the sand, but that the addition in a powder form is not acceptable.

Based upon the results with Mixed Salt #1, the testing was then extended to determine the effects of the salt at the metal-mold interface. In each instance, test samples of a molding mixture were prepared and formed into cores, onto which molten metal could be poured in a puddle atop the core. This provided a solid metal specimen with at least one face that cooled in contact with the cured molding mixture.

For the metal-mold interface experiments, Mixed Salt #1 was again used, as well as two additional mixed salt compositions. Of these, Mixed Salt #2 was a mixture with a eutectic melting point of approximately 460 C. The salt consisted of 59 wt % potassium fluoride (KF), 29 wt % lithium fluoride LiF (CAS 7789-24-4) and 12 wt % sodium fluoride (NaF) (CAS 7681-49-4). As with Mixed Salt #1, Mixed Salt #2 has a eutectic melting point that is significantly lower than the melting point of any of the individual salts, which have melting points of 858 C, 870 C and 993 C, respectively.

Mixed Salt #3 was a mixture with a eutectic melting point of approximately 420 C. The salt consisted of 50 wt % potassium fluoroborate ($KBF_4$). 47 wt % potassium hexafluorotitanate ($K_2TiF_6$) and 3 wt % potassium chloride (KCl). The eutectic melting point of Mixed Salt #3 is significant lower than any of the individual melting points, which are 530 C, 780 C and 780 C, respectively. Additionally, and to establish a baseline, experiments were performed with no salt added to the sand, as well as with $KBF_4$ being added to the sand.

In the following experiments, the binder selected was a commercially available two component cold box binder, specifically an epoxy-acrylic binder used in conjunction with $SO_2$ as the curing gas. In such a system, the Part I component, available as ISOSET THERMOSHIELD™ 4480 from ASK Chemicals L.P., comprised an epoxy resin, cumene hydroperoxide and a set of suitable complements. The Part II component, available as ISOSET THERMOSHIELD 4491 comprised an epoxy resin and an acrylate accompanied by a set of suitable complements. The molding sand selected was Wedron 410. The binder was added in a 50/50 ratio of Part I/Part II, at an amount of 1 wt % based on the sand, which in each case had already been treated with the salt additive, either by addition as a powder or as a pre-coating from a melt. After being mixed with the molding sand (with salt added as a powder), the resulting foundry mixture was cured with 35% sulfur dioxide blended in nitrogen, according to conventional industry practice.

Because metal-mold reaction is believed to be attributable, at least in part, to moisture, all cores were made under high humidity conditions with sand containing at least 0.06% water.

To evaluate the results obtained in each instance, the metal-mold face of the solidified metal, which was aluminum alloy 319, was examined visually, with and without an optical microscope, for the presence of insular structures in a continuous matrix and for obvious shrinkage. Each specimen was rated on a scale of from 1 to 5, running from best to worst. Specimens rated above 2 were deemed to be outside the scope of the inventive concept.

Example 1 had no salt additive and was intended as a baseline with a rating of 5, against which other specimens could be compared. The visual inspection showed lots of insular structures with signs of shrinkage.

Examples 2-4 were three experiments using $KBF_4$ in powder form added to the sand directly before binder addition. In Example 2, $KBF_4$ was added to the sand at 0.3 wt %, based on the sand. Minor insular structures were seen, resulting in a rating of 2.5, which was considered to be effective (as an improvement over the baseline), but not within the inventive scope. In Example 3, $KBF_4$ was added to the sand at 0.2 wt %, based on the sand. Minor, but an increased number of, insular structures were seen, resulting in a rating of 3.5. This was also considered to be effective (as an improvement over the baseline), but not within the inventive scope. In Example 4, $KBF_4$ was added to the sand at 0.1 wt %, based on the sand. The insular structures were less than those seen in the baseline, but more than in Examples 2 or 3, resulting in a rating of 4. This Example was considered to be effective (as an improvement over the baseline), but not within the inventive scope.

In Example 5, $KBF_4$ was added to the sand at a rate of 0.3 wt % based on the sand (identical to Example 2), but the addition was by pre-coating the sand to 600 C and then cooling the salt-coated sand to ambient temperature before adding binder and preparing the core. Only a few insular structures were observed, resulting in a rating of 2. The pre-coating was more effective than adding as powder, for $KBF_4$ at the 0.3 wt % level.

Examples 6 through 8 were experiments in which pre-coating was further examined, using the three Mixed Salts described above. In each case, the Mixed Salt was added at the same 0.3 wt % level that was used for $KBF_4$ in Examples 2 and 5. In Example 6, Mixed Salt #1 was used and the result rated at 1.5, that is, better than Example 5. Nearly no insular structures were observed. In Example 7, Mixed Salt #2 was used and a result very similar to Example 6 was observed, with nearly no insular structures observed. In Example 8, Mixed Salt #3 was used and the best result of the series was seen, with no noticeable insular structures. All of Examples 5 through 8 were considered within the scope of the inventive concept.

Example 9 was a further example involving adding a salt, in this case $K_2TiF_6$, directly as a powder to the sand, at the 0.3 wt % level, based on the sand, prior to adding the binder and making the core. The result was rated at 5, i.e. no improvement compared to the baseline was obtained.

These examples illustrate that adding a salt with a melting point in the appropriate range to a molding sand that is heated in the 500 to 700 C range can result in a modified molding sand that can reduce the effects of metal-mold reaction. There are a large number of salts having an appropriate melting point, and the melting point can be selected by using eutectic mixtures of various salts, as in the mixed salts described here. Salts that have been determined to be useful typically include a halide (Group VII A) anion. They have also typically included a Group IA cation. The salts may be binary, but may be more complex, as indicated by salts that include titanium or boron. To effectively be used for coating the molding sand, it is desirable for the salt to have a melting point of the salt sufficiently low to coat molding salt particles that have been heated to a temperature in the 500 to 700 C range.

What is claimed is:

1. A molding material mixture for producing casting molds for metal processing comprising:
   a free-flowing refractory molding material; and
   a binder, provided as a two-component system that is mixed and cured at the time of use, wherein the refractory molding material has been coated with a mixture of inorganic salts exhibiting a eutectic melting point in the range of 400° C. to 500° C.

2. The molding material mixture of claim 1, wherein the free-flowing refractory molding material comprises a molding sand.

3. The molding material mixture of claim 1, wherein the two-component binder system is an epoxy-acrylic binder that is cured with sulfur dioxide gas.

4. The molding material mixture of claim 1, wherein the mixture of inorganic salts is a mixture of three inorganic salts.

5. The molding material mixture of claim 4, wherein each of the inorganic salts in the mixture has a Group IA cation.

6. The molding material mixture of claim 5, wherein the Group IA cation of at least one of the inorganic salts is potassium.

7. The molding material mixture of claim 6, wherein the Group IA cation of each of the inorganic salts is potassium.

8. The molding material mixture of claim 5, wherein each of the inorganic salts in the mixture has, as an anion, either a halide anion or a fluorine complex of boron or titanium.

9. The molding material mixture of claim 8, wherein each of the inorganic salts in the mixture has fluorine as an anion.

10. The molding material mixture of claim 5, wherein each of the inorganic salts in the mixture has an individual melting point that is greater than 500° C. and at least two of the inorganic salts has an individual melting point that is greater than 700° C.

11. The molding material mixture of claim 1, wherein the mixture of inorganic salts is a mixture consisting of, by weight:
   74% potassium fluoroborate;
   15% potassium chloride; and
   12% potassium fluoride, wherein the mixture has a eutectic melting point of 420° C.

12. The molding material mixture of claim 1, wherein the mixture of inorganic salts is a mixture consisting of, by weight:
   59% potassium fluoride;
   29% lithium fluoride; and
   12% sodium fluoride, wherein the mixture has a eutectic melting point of 460° C.

13. The molding material mixture of claim 1, wherein the mixture of inorganic salts is a mixture consisting of, by weight:
   50% potassium fluoroborate;
   47% potassium hexafluorotitanate; and
   3% potassium chloride, wherein the mixture has a eutectic melting point of 420° C.

14. A method of preparing a refractory molding material for use in producing casting molds for metal processing, comprising the steps of:
   obtaining a free-flowing refractory molding mixture;
   obtaining a mixture of inorganic salts exhibiting a eutectic melting point in the range of 400° C. to 500° C.;
   contacting the refractory molding mixture with the mixture of inorganic salts at a temperature in the range of 500° C. to 700° C., such that the refractory molding mixture is coated with the mixture of inorganic salts and remains free flowing; and
   cooling the coated refractory molding mixture to ambient temperature.

15. The method of claim 14, wherein the mixture of inorganic salts is contacted with the refractory molding mixture in an amount of 0.3% to 0.4% by weight.

16. The molding material of claim 1, wherein the eutectic melting point of the mixture of inorganic salts is in the range of 420° C. to 460° C.

17. The molding material mixture of claim 2, wherein the mixture of inorganic salts is a mixture of three inorganic salts.

18. The molding material mixture of claim 3, wherein the mixture of inorganic salts is a mixture of three inorganic salts.

19. The molding material mixture of claim 17, wherein each of the inorganic salts in the mixture has a Group IA cation.

20. The molding material mixture of claim 18, wherein each of the inorganic salts in the mixture has a Group IA cation.

21. The molding material mixture of claim 19, wherein the Group IA cation of at least one of the inorganic salts is potassium.

22. The molding material mixture of claim 21, wherein the Group IA cation of each of the inorganic salts is potassium.

23. The molding material mixture of claim 20, wherein the Group IA cation of at least one of the inorganic salts is potassium.

24. The molding material mixture of claim 23, wherein the Group IA cation of each of the inorganic salts is potassium.

25. The molding material mixture of claim 19, wherein each of the inorganic salts in the mixture has as an anion either a halide anion or a fluorine complex of boron or titanium.

26. The molding material mixture of claim 25, wherein each of the inorganic salts in the mixture has fluorine as an anion.

27. The molding material mixture of claim 20, wherein each of the inorganic salts in the mixture has as an anion either a halide anion or a fluorine complex of boron or titanium.

28. The molding material mixture of claim 27, wherein each of the inorganic salts in the mixture has fluorine as an anion.

29. The molding material mixture of claim 19, wherein each of the inorganic salts in the mixture has an individual melting point that is greater than 500° C. and at least two of the inorganic salts has an individual melting point that is greater than 700° C.

30. The molding material mixture of claim 20, wherein each of the inorganic salts in the mixture has an individual melting point that is greater than 500° C. and at least two of the inorganic salts has an individual melting point that is greater than 700° C.

31. The molding material mixture of claim 2, wherein the mixture of inorganic salts is a mixture consisting of, by weight:
   74% potassium fluoroborate;
   15% potassium chloride; and
   12% potassium fluoride, wherein the mixture has a eutectic melting point of 420° C.

32. The molding material mixture of claim 2, wherein the mixture of inorganic salts is a mixture consisting of, by weight:

59% potassium fluoride;
29% lithium fluoride; and
12% sodium fluoride, wherein the mixture has a eutectic melting point of 460° C.

33. The molding material mixture of claim 2, wherein the mixture of inorganic salts is a mixture consisting of, by weight:
50% potassium fluoroborate;
47% potassium hexafluorotitanate; and
3% potassium chloride, wherein the mixture has a eutectic melting point of 420° C.

34. The molding material mixture of claim 3, wherein the mixture of inorganic salts is a mixture consisting of, by weight:
74% potassium fluoroborate;
15% potassium chloride; and 12% potassium fluoride, wherein the mixture has a eutectic melting point of 420° C.

35. The molding material mixture of claim 3, wherein the mixture of inorganic salts is a mixture consisting of, by weight:
59% potassium fluoride;
29% lithium fluoride; and 12% sodium fluoride,
wherein the mixture has a eutectic melting point of 460° C.

36. The molding material mixture of claim 6, wherein the mixture of inorganic salts is a mixture consisting of, by weight:
50% potassium fluoroborate;
47% potassium hexafluorotitanate; and 3% potassium chloride,
wherein the mixture has a eutectic melting point of 420° C.

* * * * *